United States Patent Office 3,337,844
Patented Aug. 22, 1967

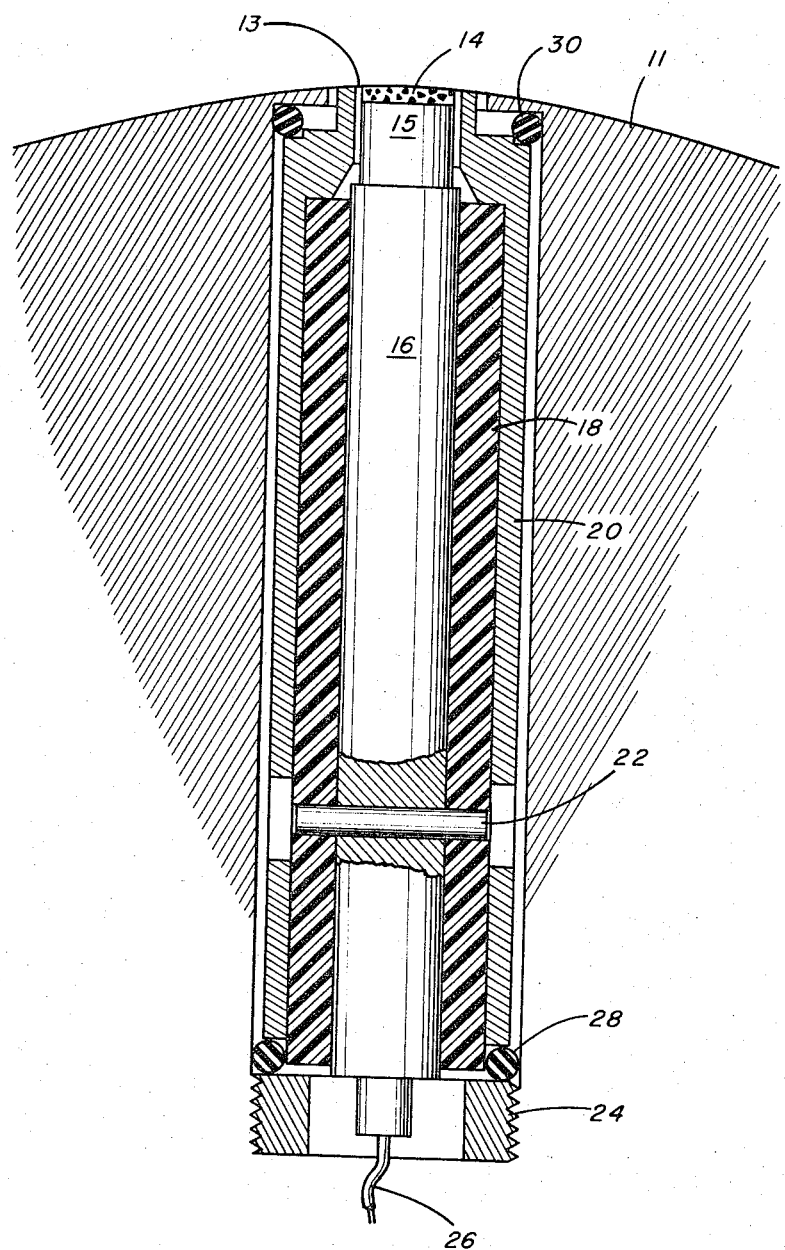
Frank P. Baltakis
INVENTOR

3,337,844
RAPID RESPONSE PRESSURE TRANSDUCER
Frank P. Baltakis, Washington, D.C., assignor to the United States of America as represented by the Secretary of the Navy
Filed July 6, 1966, Ser. No. 563,649
3 Claims. (Cl. 340—10)

ABSTRACT OF THE DISCLOSURE

An electrical transducer for sensing transient pressure as low as .02 p.s.i. having a pressure responsive barium titanate crystal bonded to a lead-tin alloy rod seated in a Teflon sleeve.

---

The invention described herein may be manufactured and used by or for the Government of the United States of America for governmental purposes without the payment of any royalties thereon or therefor.

This invention relates to a pressure transducer and more specifically to a transducer for sensing transient pressures.

Pressure responsive transducers are well known in the art. Generally fast response pressure transducers have been of the piezoelectric or magnetostrictive variety and have found wide usage in underwater sonar detector applications and wind tunnel air pressure studies. Recently in shock wave analysis in ballistics ranges and wind tunnel applications, a need has arisen for a more rapidly responding pressure transducer than has been available in the past, which can reliably and accurately detect transient pressures of very short duration.

Accordingly therefore an object of this invention is to provide a new and improved pressure transducer.

Another object is the provision of a pressure transducer which is quick responding and sensitive to transient pressures of very small magnitude.

Still another object is to provide a pressure transducer which can be housed in a model without interferring with the aerodynamic characteristics of the model.

Other objects, attendant advantages and features of this invention will be readily appreciated as the same becomes better understood by reference to the following detailed description when considered in connection with the accompanying drawing in which:

The figure illustrates one embodiment of the invention.

The figure shows one embodiment of the invention where the novel pressure transducer is housed in an aerodynamic model surface 11 with a piezoelectric crystal 15 bonded to one end of a metal rod 16. Near the other end of the rod, one or more metal pins 22 anchor the rod in an insulator sleeve 18 which may be Teflon or similar material. Electrical output lead 26 provides a signal from the transducer which varies according to pressure changes in the crystal.

In the figure a barium titanate crystal and a lead-tin alloy rod are selected which have the same acoustic impedance. Pressure pulses originating in the crystal 15 from environmental pressures, therefore, pass from the crystal to the supporting rod 16 without acoustic reflections occurring at the interface between the crystal and the rod. The crystal 15 is attached rigidly only at the interface so is free to have a small differential oscillation with respect to the housing 20 without inducing stresses in the crystal. With the supporting rod seated in a Teflon sleeve 18, which has been press fitted into the metal housing 20, good internal damping is provided. With this arrangement, pressures between the range of about .02 p.s.i. to 50 p.s.i. can be measured.

When the transducer is fully assembled, housing 20 containing the sensing elements may be moved into the sensing position shown in the figure with O rings 28 and 30 isolating the transducer from mechanical vibration of the model and retaining nut 24 holding the housing in place. A thin layer of conducting cement 14 is applied to the top of the crystal and contoured to the surface 11. The cement provides both shielding against radiation heating and contouring capabilities when the transducer is used for sensing transient pressure on a surface of a wind tunnel or ballistics range model. Finally, a thin layer of tape is used to seal the opening 13 made in the model surface.

The transducer in operation is capable of detecting transient pressures resulting from shock waves that may last only a few microseconds in duration. By anchoring the supporting rod with multiple pins and using stronger rod materials, higher pressure ranges can be measured than in the embodiment described in the figure.

The applicant has described a novel pressure transducer which has a quick response to transient pressures of a wide pressure range and which may be contained in a small housing for confinement in a model skin. Although a preferred embodiment has been described, the invention is not so limited. Obviously many modifications and variations in the present invention are possible in the light of the above teachings and it is, therefore, to be understood that within the scope of the appended claims the invention may be practiced otherwise than as specifically described.

What is claimed is:
1. A pressure transducer for sensing transient pressures over a wide pressure range comprising
   a housing,
   a pressure responsive crystal element for sensing transient pressures and converting said pressures to electrical signals,
   a metal rod having one end bonded to one surface of said crystal element and forming an acoustical impedance match with said element, and
   means for securing said rod and crystal to said housing including a Teflon sleeve press fitted between said rod and the inside wall of said housing, whereby said crystal is free to oscillate in said housing but is damped by said rod.
2. The transducer of claim 1 further comprising in said securing means, pin means fastening said rod to the sleeve.
3. A pressure transducer for sensing transient pressures over a wide pressure range comprising
   a housing,
   a pressure responsive barium titanate crystal for sensing transient pressures and converting said pressures to electrical signals,
   a lead-tin alloy rod having one end bonded to one surface of said crystal and forming an acoustical impedance match with said crystal, and
   means for securing said rod and crystal to said housing.

References Cited

UNITED STATES PATENTS

| | | | |
|---|---|---|---|
| 2,405,604 | 8/1946 | Pope | 340—10 |
| 2,425,868 | 8/1947 | Dillon. | |
| 3,171,989 | 3/1965 | Hatschek | 73—398 X |
| 3,189,767 | 6/1965 | Goldman et al. | |

RODNEY D. BENNETT, *Primary Examiner.*

CHESTER L. JUSTUS, *Examiner.*

B. L. RIBANDO, *Assistant Examiner.*